United States Patent
Kim

(10) Patent No.: US 9,506,520 B2
(45) Date of Patent: Nov. 29, 2016

(54) DAMPING FORCE VARIABLE VALVE ASSEMBLY

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/699,874

(22) Filed: Apr. 29, 2015

(65) Prior Publication Data

US 2015/0316117 A1 Nov. 5, 2015

(30) Foreign Application Priority Data

Apr. 30, 2014 (KR) .................. 10-2014-0052373

(51) Int. Cl.
*F16F 9/34* (2006.01)
*F16F 9/512* (2006.01)
*F16F 9/348* (2006.01)
*F16F 9/46* (2006.01)

(52) U.S. Cl.
CPC ............ *F16F 9/3415* (2013.01); *F16F 9/34* (2013.01); *F16F 9/3482* (2013.01); *F16F 9/3488* (2013.01); *F16F 9/512* (2013.01); *F16F 9/464* (2013.01); *F16F 2228/066* (2013.01); *F16F 2238/04* (2013.01)

(58) Field of Classification Search
CPC ........ F16F 9/34; F16F 9/3488; F16F 9/3485; F16F 9/3482; F16F 9/46; F16F 9/464; F16F 15/0275; F16F 9/512
See application file for complete search history.

(56) References Cited

U.S. PATENT DOCUMENTS

| 6,079,526 | A  | * | 6/2000  | Nezu ........................ | F16F 9/46 188/266.6 |
| 2008/0006493 | A1 | * | 1/2008  | Jee ........................... | F16F 9/348 188/282.5 |
| 2008/0190719 | A1 | * | 8/2008  | Jee .......................... | F16F 9/3207 188/322.13 |
| 2012/0305348 | A1 | * | 12/2012 | Katayama ............. | B60G 17/08 188/266.2 |

\* cited by examiner

*Primary Examiner* — Anna Momper
(74) *Attorney, Agent, or Firm* — McDermott Will & Emery LLP

(57) ABSTRACT

A damping force variable valve assembly includes a spool (144) which is moved by a magnetic force, a spool guide (145) which surrounds the spool (144), valve bodies (151, 152), a main valve (150), a back pressure chamber (160) which is formed at the back of the main valve (150), and an elastic opening/closing portion which is installed in the valve body to open and close a pressure adjustment passage (180) communicating the inside of the back pressure chamber (160) with the outside of the back pressure chamber (160). Due to the interaction between the spool (144) and the spool guide (145), the damping force of the shock absorber is variable between a hard mode in which the back pressure of the back pressure chamber (160) is increased and a soft mode in which the back pressure of the back pressure chamber (160) is decreased. In a case where a flow velocity of a working fluid is low in the hard mode, the elastic opening/closing portion opens the pressure adjustment passage (180) when an internal pressure of the back pressure chamber (160) exceeds a preset pressure.

9 Claims, 5 Drawing Sheets

DAMPING FORCE VARIABLE VALVE ASSEMBLY

CROSS-REFERENCE(S) TO RELATED APPLICATION

This application claims priority of Korean Patent Application No. 10-2014-0052373, filed on Apr. 30, 2014, in the Korean Intellectual Property Office, which is hereby incorporated by reference in its entirety.

BACKGROUND OF THE INVENTION

Field of the Invention

The present invention relates to a damping force variable shock absorber, and more particularly, to a damping force variable valve assembly having a low speed control valve capable of controlling an extremely low speed flow rate and a low speed flow rate when a damping force variable valve operates in a soft mode.

Description of the Related Art

In general, a shock absorber is installed in means of transportation, such as automobile, and improves a ride comfort by absorbing and damping a vibration or shock from a road surface during driving.

The shock absorber includes a piston rod installed in a cylinder to perform compression and rebound strokes, and a piston valve disposed in the cylinder in a state of being connected to the piston rod to generate a damping force.

When the damping force is set to be low, the shock absorber can improve ride comfort by absorbing a vibration caused by unevenness of a road surface. On the contrary, when the damping force is set to be high, the shock absorber can improve steering stability by suppressing a change in a posture of a vehicle body. Therefore, in the past, a damping force variable shock absorber, to which a damping force characteristic is differently set according to the purpose of use of the vehicle, has been applied to a vehicle.

Recently, there has been developed a damping force variable shock absorber in which a damping force variable valve capable of appropriately adjusting a damping force characteristic is mounted on one side, such that the damping force characteristic is appropriately adjusted to improve a ride comfort or a steering ability according to a road surface and a driving condition.

FIG. 1 is a sectional view illustrating an example of a damping force variable shock absorber according to the related art. Referring to FIG. 1, the damping force variable shock absorber 10 according to the related art includes a base shell 12, and an inner tube 14 which is installed inside the base shell 12 and in which a piston rod 24 is movably installed in a length direction. A rod guide 26 and a body valve 27 are installed in an upper portion and a lower portion of the inner tube 14 and the base shell 12, respectively. In the inside of the inner tube 14, a piston valve 25 is connected to one end of the piston rod 24, and the piston valve 25 partitions the internal space of the inner tube 14 into a rebound chamber 20 and a compression chamber 22. A top cap 28 and a base cap 29 are installed in an upper portion and a lower portion of the base shell 12, respectively.

A reservoir chamber 30 is formed between the inner tube 14 and the base shell 12 to compensate for a change in the volume of the inner tube 14 according to the reciprocating motion of the piston rod 24. A flow of a working fluid between the reservoir chamber 30 and the compression chamber 22 is controlled by the body valve 27.

In addition, a separator tube 16 is installed inside the base shell 12. Due to the separator tube 16, the inside of the base shell 12 is partitioned into a high pressure chamber PH connected to the rebound chamber 20, and a low pressure chamber PL serving as the reservoir chamber 30.

The high pressure chamber PH is connected to the rebound chamber 20 through an inner hole 14a of the inner tube 14. The low pressure chamber PL is connected to the compression chamber 22 through a lower passage 32 formed between a body portion of the body valve 27 and the base shell 12 (or the base cap 29) and a passage formed in the body valve 27.

Meanwhile, the shock absorber 10 according to the related art includes a damping force variable valve assembly 40 mounted on one side of the base shell 12 so as to vary a damping force.

The damping force variable valve assembly 40 is provided with oil passages respectively connected to the base shell 12 and the separator tube 16 and communicating with the high pressure chamber PH and the low pressure chamber PL. In addition, the damping force variable valve assembly 40 includes a spool 44 installed to be moved by a driving of a plunger 42. An inner passage communicating with the high pressure chamber PH and the low pressure chamber PL is varied by the movement of the spool 44, and the damping force of the shock absorber 10 is varied accordingly. The plunger 42 is configured to move in a horizontal direction, when viewed in FIG. 1, due to a magnetic force generated when an electric current flows through a solenoid.

In the damping force variable valve assembly according to the related art, for example, when the plunger 42 moves to one side (left side in FIG. 1), the spool 44 closes a passage to generate a high damping force (hard mode). On the contrary, when the plunger 42 moves to the other side (right side in FIG. 1), the spool 44 opens a passage to generate a low damping force (soft mode).

In the technical field to which the invention pertains, many efforts have been made to provide a shock absorber having a good damping force variable characteristic by improving the performance of a damping force variable valve assembly. For example, Korean Patent Application Publication Nos. 10-2010-0023074 and 10-2010-0007187 disclose techniques of damping force variable valve assemblies recently developed for a shock absorber.

A damping force variable valve assembly according to the related art controls a final exit by using a disk valve in a hard mode and discharges a fluid through a slit formed in the disk valve so as to control a damping force with respect to an extremely low flow rate and a low speed flow rate.

In a case where the damping force variable shock absorber according to the related art operates in the hard mode, when a moving speed of a working fluid is high, that is, when a flow rate is high, a resistance is determined by a sagging amount of main disk valves stacked in a valve assembly.

However, in a case where an input (that is, shock) from a road surface is small and thus a moving speed of a working fluid is low or extremely low, a flow rate of the working fluid flowing in the shock absorber is extremely low. As a result, a resistance caused by a slit (that is, a fixing orifice) is almost not formed. Thus, a damping force is not generated in a low speed section and a small frequent vibration transferred from the road surface cannot be damped.

In order to solve this problem, a size of a slit may be reduced to increase a damping force at a low speed in a hard mode. However, in this case, due to characteristics of an orifice, a damping force is rapidly increased as a flow rate is increased.

In addition, when the size of the slit is reduced, the size of the fixing orifice is reduced. Accordingly, a hard damping force or dispersion may greatly occur and foreign substances may clog the slit, thus degrading operation performance.

SUMMARY OF THE INVENTION

An aspect of the present invention is directed to a damping force variable valve assembly in which a discharge passage is not formed at a preset pressure or less by adjusting a pressure of a back pressure chamber through an opening/closing operation of an elastic opening/closing portion; when a damping force variable valve assembly operates in a hard mode, a stably high damping force is generated in a section where a flow rate of a working fluid is low or extremely low, thereby controlling a behavior of a vehicle at an early stage; and a degressive damping force characteristic is provided in a section where a flow rate of a working fluid is medium or high.

Another aspect of the present invention is directed to a damping force variable valve assembly having a valve structure for a low speed flow rate control, which generates a damping force even when a flow rate of a working fluid is low or extremely low in a case where a damping force variable valve assembly operates in a soft mode.

According to the present invention, a damping force variable valve assembly, which is installed in a damping force variable shock absorber to adjust a damping force of the shock absorber, includes: a solenoid configured to generate a magnetic force when an electric current is applied thereto; a spool configured to be moved by the magnetic force of the solenoid; a spool guide configured to surround the spool so as to guide a movement of the spool; a valve body which is installed in the spool guide; a main valve which is installed to cover a main passage formed in the valve body and generate a damping force; a back pressure chamber which is formed to have a back pressure pressurizing the main valve from the back of the main valve; a chamber forming body which is installed outside the valve body to form the back pressure chamber; and an elastic opening/closing portion which is installed in the valve body to open and close a pressure adjustment passage communicating the inside of the back pressure chamber with the outside of the back pressure chamber, wherein as an inner passage within the damping force variable valve assembly is changed by interaction between the spool and the spool guide, the damping force of the shock absorber is variable between a hard mode in which the back pressure of the back pressure chamber is increased and a soft mode in which the back pressure of the back pressure chamber is decreased, and in a case where a flow velocity of a working fluid is low in the hard mode, the elastic opening/closing portion opens the pressure adjustment passage when an internal pressure of the back pressure chamber exceeds a preset pressure.

The elastic opening/closing portion may include a blocking member configured to block the pressure adjustment passage, and an elastic member configured to elastically support the blocking member and to be deformed when the internal pressure of the back pressure chamber exceeds the preset pressure and open the blocking member.

The elastic opening/closing portion may be disposed on an exit side of the pressure adjustment passage in the valve body, and a concave portion which is connected to the pressure adjustment passage may be formed in the valve body such that the elastic opening/closing portion is disposed therein.

The concave portion may include a mounting portion which is formed in the pressure adjustment passage such that the blocking member is mounted thereon, and a locking portion which is formed on an exit side of the concave portion. One end of the elastic member may be supported to the locking portion, and the other end of the elastic member may be supported to the blocking member, such that the elastic member pressurizes the blocking member in a direction of closing the pressure adjustment passage.

The blocking member may be larger than the pressure adjustment passage and smaller than the concave portion.

The blocking member may have a disk shape.

The blocking member may have a spherical shape.

The blocking member may have a ring shape, and the pressure adjustment passage may be plurally provided and the plurality of pressure adjustment passages are circularly arranged in the valve body. The concave portion may be formed to have a circular shape to connect all the pressure adjustment passages. The blocking member having the ring shape may be disposed to close all the pressure adjustment passages circularly arranged in the valve body. The elastic member may be a coil spring having a diameter corresponding to the blocking member having the ring shape.

The pressure adjustment passage may be plurally formed, and each of the pressure adjustment passages may be opened and closed by the single elastic opening/closing portion.

The pressure adjustment passage may be plurally formed, and the plurality of pressure adjustment passages may be opened and closed by the single elastic opening/closing portion.

The damping force variable valve assembly may further include a low speed control valve which is installed to cover a low speed passage formed in the valve body and generate a damping force, and the low speed control valve may generate the damping force when the flow velocity of the working fluid is low in the soft mode.

The valve body may be formed by sintering and the chamber forming body is formed by pressing.

The spool may provided by alternately forming large-diameter portions and small-diameter portion, and the large-diameter portions may be formed on both sides of the small-diameter portion, so that a pressure of the working fluid passing through the small-diameter portion is equally applied to the large-diameter portions formed on both sides of the small-diameter portion.

A stepped portion coming into contact with the low speed control valve may be formed on an outer peripheral surface of an inlet port of the spool guide, and the low speed control valve may be disposed and assembled between the stepped portion and the valve body fitted into the spool guide.

The main valve and the low speed control valve may be installed in parallel.

DETAILED DESCRIPTION OF EXEMPLARY EMBODIMENTS

Hereinafter, exemplary embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

In addition, detailed descriptions of well-known technologies or the like will be omitted since they would unnecessarily obscure the subject matters of the present invention.

Figure 2:
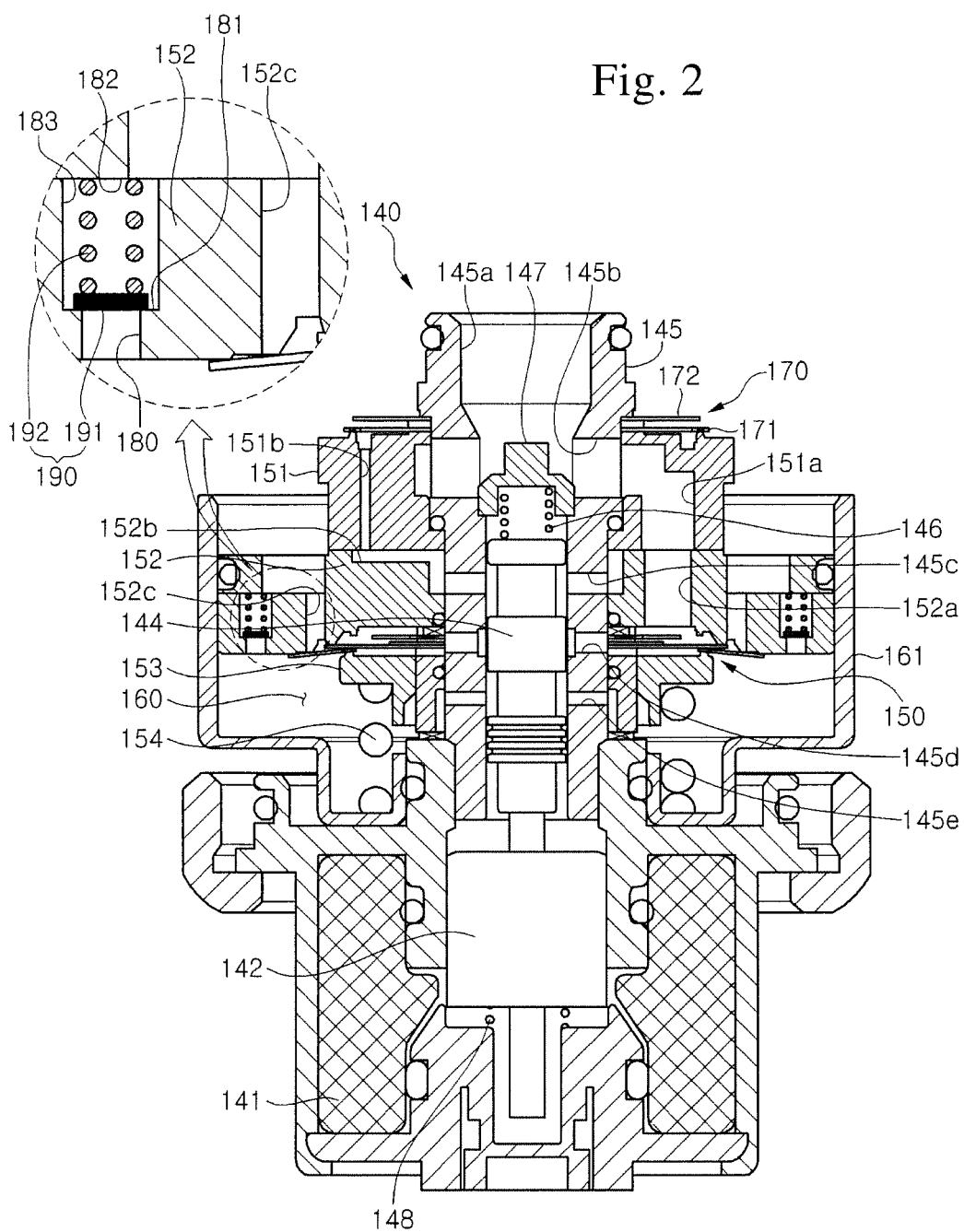
FIG. 2 is a front cross-sectional view illustrating a damping force variable valve assembly according to the present invention.
Figure 4:
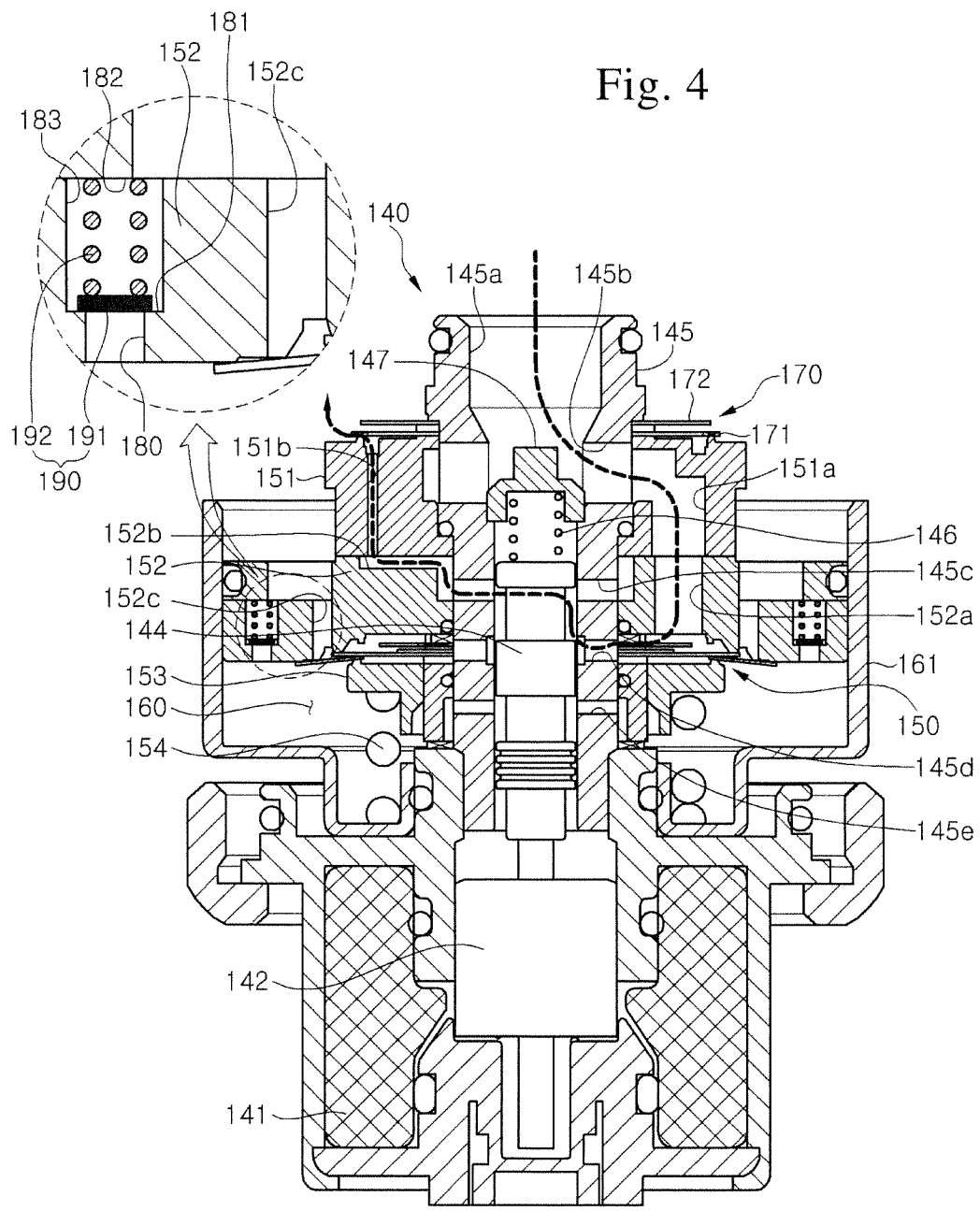
FIG. 4 is an operation state diagram illustrating a flow of a fluid at a low speed of the damping force variable valve assembly according to the present invention.
Figure 5:
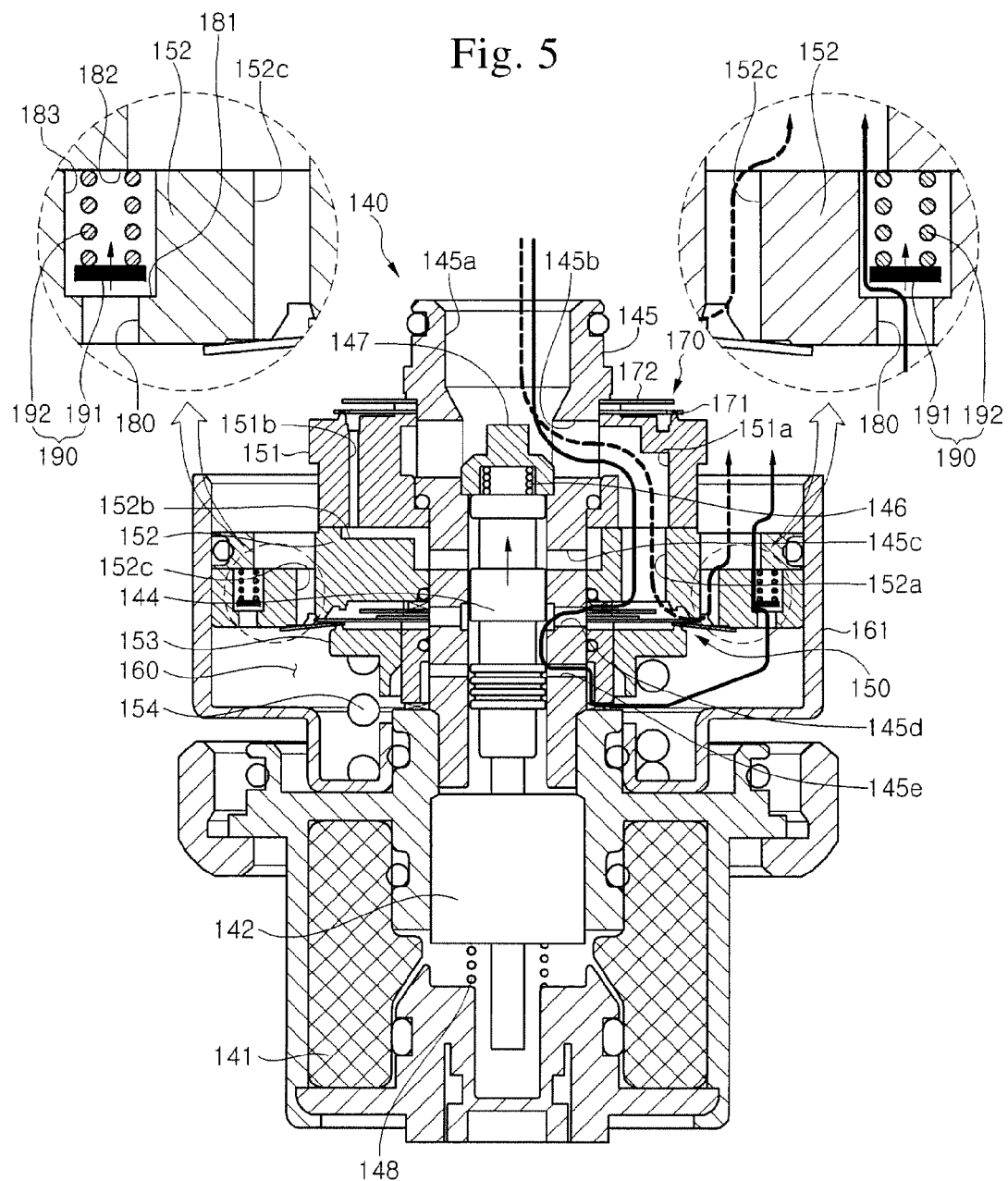
FIG. 5 is an operation state diagram illustrating a flow of a fluid at a medium/high speed of the damping force variable valve assembly according to the present invention.

FIG. 2 is a front cross-sectional view illustrating a damping force variable valve assembly according to the present invention. FIG. 4 is an operation state diagram illustrating a flow of a fluid at a low speed of the damping force variable valve assembly according to the present invention. FIG. 5 is an operation state diagram illustrating a flow of a fluid at a medium/high speed of the damping force variable valve assembly according to the present invention.

Figure 1:
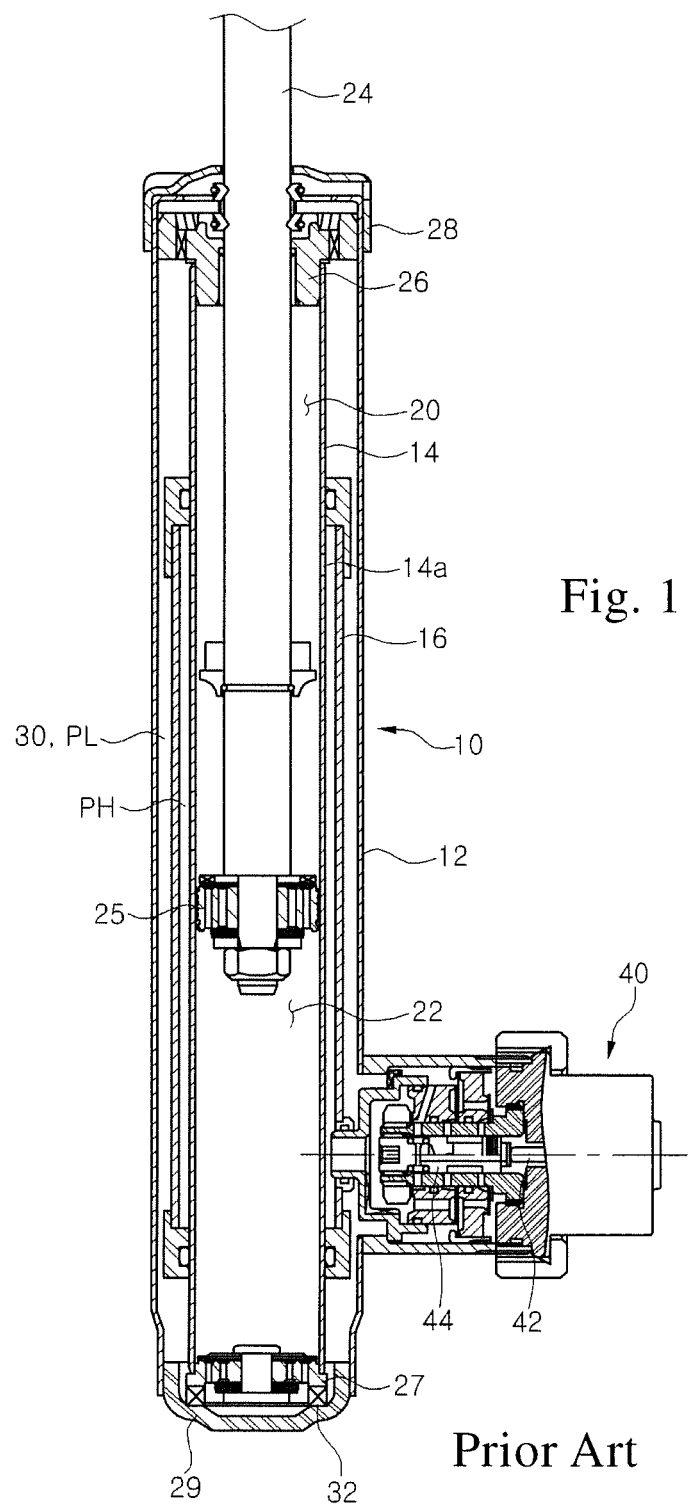
FIG. 1 is a front cross-sectional view illustrating a damping force variable shock absorber according to the related art.

As in the damping force variable shock absorber of FIG. 1 according to the related art, the damping force variable valve assembly 140 of the damping force variable shock absorber according to the present invention is provided with oil passages respectively connected to a base shell 12 and a separator tube 16 and communicating with a high pressure chamber PH and a low pressure chamber PL. Since the configuration in which the damping force variable valve assembly 140 is connected to the base shell 12 and the separator tube 16 and communicates with the high pressure chamber PH and the low pressure chamber PL is similar to the related art illustrated in FIG. 1, a configuration in which the damping force variable valve assembly 140 is connected to a side of the shock absorber is omitted in FIGS. 2, 4, and 5.

The damping force variable valve assembly 140 includes a spool 144 installed to be moved by a driving of a plunger 142. An inner passage of the damping force variable valve assembly 140, which communicates with the high pressure chamber PH and the low pressure chamber PL, is varied by the movement of the spool 144, and a damping force of the shock absorber is varied accordingly.

The damping force variable valve assembly 140 includes a main valve 150 and a back pressure chamber 160 used for changing the damping force of the shock absorber. The back pressure chamber 160 is provided to have a back pressure that pressurizes the main valve 150 from the back of the main valve 150.

The main valve 150 is installed to cover the main passage formed in a valve body from the back of a valve body. On the other hand, the valve body is connected to the high pressure chamber PH of the above-described shock absorber through a spool guide 145 installed inside. The valve body is formed by sintering, but is not necessarily formed by a single sintered body. In the present embodiment, the valve body is formed by a first body 151 and a second body 152 formed by sintering. In addition, passages for performing various functions are formed in the first body 151 and the second body 152 constituting the valve body.

The spool guide 145 includes an inlet port 145a formed along a length direction so as to allow a working fluid to be introduced from the high pressure chamber PH, one or more first inlet passages 145b formed along a width direction so as to communicate with the inlet port 145a, and first to third passages 145c, 145d, and 145e formed to block or permit the flow of the working fluid by interaction with the spool 144, as described below.

The first body 151 includes a second inlet passage 151a formed to communicate with the first inlet passage 145b of the spool guide 145, and the second body 152 includes a third inlet passage 152a formed to communicate with the second inlet passage 151a of the first body 151.

The inlet port 145a, the first inlet passage 145b, the second inlet passage 151a, and the third inlet passage 152a form the main passage such that the working fluid from the high pressure chamber PH can flow toward the main valve 150.

Meanwhile, in order to form the passage of the working fluid flowing toward a low speed control valve 170 in a low speed section, a first low speed passage 152b is formed in the second body 152 and a second low speed passage 151b is formed in the first body 151.

In addition, in order to form the passage of the working fluid flowing toward the low pressure chamber PL through the main valve 150 in a medium/high speed section, a medium/high speed passage 152c is formed in the second body 152.

The back pressure chamber 160 is provided such that the pressure thereof is varied according to a driving of a solenoid 141 (that is, a subsequent movement of the spool 144). A change in the pressure inside the back pressure chamber 160, that is, a change in the back pressure with respect to the main valve 150, causes the main valve 150 to vary a force against the fluid passing through the main passage, thereby providing a varied damping force to the shock absorber.

According to the present invention, a chamber forming body 161 for forming the back pressure chamber 160 may be formed by pressing. Since the chamber forming body 161 is formed as a pressed product, it is possible to reduce a total weight of the damping force variable valve assembly, reduce manufacturing cost and time of the valve body formed by sintering, and reduce time and effort necessary for manufacturing.

A main retainer 153 and a main spring 154 are disposed in the back pressure chamber 160 so as to pressurize disks of the main valve 150 toward the valve body, that is, the second body 152.

The damping force variable valve assembly 140 includes a plunger 142 of which a moving distance is changed according to an amount of electric current applied to the solenoid 141. On the other hand, the damping force variable valve assembly 140 includes the spool 144 that moves along a straight line while interlocking with the plunger 142 in a state of being disposed on the same axis as the plunger 142. The spool 144 moves along the spool guide 145. One end of the spool 144 comes into contact with the plunger 142, and the other end of the spool 144 is elastically supported by a spool compression spring 146. The spool compression spring 146 is supported by a plug 147 connected to the spool guide 145. Therefore, the spool 144 moves forward by a pressurization of the plunger 142 and moves backward by a restoring force of the spool compression spring 146.

Figure 3:
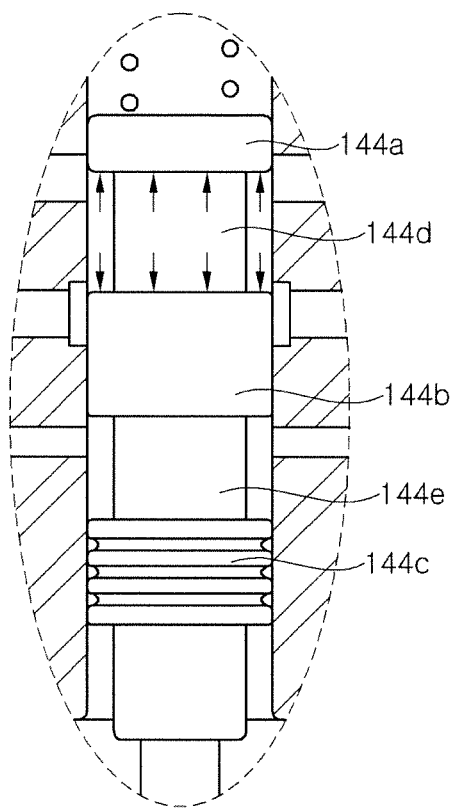
FIG. 3 is a partial enlarged cross-sectional view illustrating a spool of the damping force variable valve assembly according to the present invention.

Referring to FIG. 3, the spool 144 is provided by alternately forming large-diameter portions and small-diameter portions. That is, when viewed from above the drawing, a first large-diameter portion 144a, a first small-diameter portion 144d, a second large-diameter portion 144b, a second small-diameter portion 144e, and a third large-diameter portion 144c are sequentially formed. As the spool 144 is moved by the solenoid 141, the first small-diameter portion 144d may communicate between the first passage 145c and the second passage 145d formed by the spool guide 145, and the second small-diameter portion 144e may communicate between the third passage 145e and the second passage 145d formed by the spool guide 145.

According to the present invention, since the large-diameter portions are formed on both sides of the small-diameter portion, the pressure of the fluid is equally applied to the large-diameter portions of both sides and therefore, the position of the spool is not deviated by the pressure of the fluid.

That is, as indicated by an arrow in FIG. 3, for example, in a case where the first large-diameter portion 144a is not present, the pressure of the fluid is applied to only the upper surface of the second large-diameter portion 144b when the spool 144 moves and the first small-diameter portion 144d communicates between the first passage 145c and the second passage 145d of the spool guide 145. Therefore, when viewing the spool 144 in the drawing, a downward force is applied to the spool 144.

However, according to the present invention, since the first large-diameter portion 144a is present, the pressure of the fluid is applied to both the bottom surface of the first large-diameter portion 144a and the top surface of the second large-diameter portion 144b when the spool 144 moves and the first small-diameter portion 144d communicates between the first passage 145c and the second passage 145d of the spool guide 145. Therefore, a force for moving the spool 144 in one direction is not applied to the spool 144.

On the other hand, one end of the plunger 142 comes into contact with the spool 144, and the other end of the plunger 142 is elastically supported by the spool compression spring 148.

As the plunger 142 and the spool 144 are moved by the driving of the solenoid, a variable orifice is opened/closed or a passage area is adjusted by the interaction of the spool 144 and the spool guide 145. Therefore, the opening/closing and/or the opening degree of a back pressure adjustment passage connected from the upstream side of the main valve 150 to the back pressure chamber 160 are/is controlled.

The present invention may be configured to generate a damping force even in a case (including an extremely low speed case) where a moving speed of the working fluid is low because the low speed control valve 170 is installed in parallel to the main valve 150. The low speed control valve 170 may include a low speed disk-S 171 which is mounted on a low speed control valve mounting surface of the valve body and in which a slit is formed, and a low speed disk 172 which can control an opening pressure or opening degree of the low speed disk-S 171. Although one low speed disk-S 171 and one low speed disk 172 are illustrated in the drawing, the number thereof can be changed when necessary upon their designs.

In the second body 152, a pressure adjustment passage 180 is formed so as to communicate the back pressure chamber 160 with the low pressure chamber PL of the shock absorber (that is, the reservoir chamber 30). The pressure adjustment passage 180 functions to be opened when the internal pressure of the back pressure chamber 160 is out of a preset pressure and discharge the internal fluid of the back pressure chamber 160 to the outside.

An elastic opening/closing portion 190 is installed in the second body 152 so as to open the pressure adjustment passage 180 when the internal pressure of the back pressure chamber 160 is out of a preset pressure. The elastic opening/closing portion 190 may include a blocking member 191 and an elastic member 192.

The elastic opening/closing portion 190 may be installed on the exit side of the pressure adjustment passage 180 in the second body 152. In order to form a space where the elastic opening/closing portion 190 can be disposed, a concave portion 183 may be formed in the second body 152 such that the concave portion 183 can be connected to the pressure adjustment passage 180.

The concave portion 183 includes a mounting portion 181 on which the blocking member 191 can be mounted. The mounting portion 181 may be provided in such a manner that a width of the concave portion 183 is formed to be wider than a diameter of the pressure adjustment passage 180. A locking portion 182 may be formed in the exit of the concave portion 183.

One end of the elastic member 192 may be supported to the locking portion 182, and the other end of the elastic member 192 may be supported to the blocking member 191. The elastic member 192 pressurizes the blocking member 191 in a direction in which the pressure adjustment passage 180 is closed.

Therefore, the blocking member 191 is disposed to close the pressure adjustment passage. When the pressure transferred from the back pressure chamber 160 is higher than an applied pressure of the elastic member 192, the blocking member 191 is separated from the mounting portion 181 and the pressure adjustment passage 180 is opened accordingly.

As described above, the blocking member 191 may be installed in the exit portion of the pressure adjustment passage 180 opposite to the back pressure chamber 160.

The blocking member 191 may have a diameter larger than a diameter of the pressure adjustment passage 180 and smaller than a diameter of the concave portion 183. Therefore, when the blocking member 191 is separated from the mounting portion 181 of the pressure adjustment passage 180, the fluid may flow to the low pressure chamber PL through the lateral side of the blocking member 191 having an outer diameter smaller than an inner diameter of the pressure adjustment passage 180.

In addition, one surface of the blocking member 191 may have a disk shape or a spherical shape closely contacting the exit of the pressure adjustment passage 180. When the blocking member 191 has a spherical shape, a part of the blocking member 191 may be disposed in a state of being partially inserted on the exit portion of the pressure adjustment passage 180.

The elastic member 192 elastically supports the blocking member 191 at a blocking position in the concave portion 183. When the pressure of the back pressure chamber 160 is out of the preset pressure, the elastic member 192 is compressed to open the blocking member 191.

One end of the elastic member 192 may come into close contact with the mounting portion 181 formed in the exit of the pressure adjustment passage 180, and the other end of the elastic member 192 may be provided with a coil spring locked to the locking portion 182. Alternatively, a wave spring or a disk spring may be used as the elastic member 192.

In addition, the configuration in which one elastic opening/closing portion 190 is correspondingly arranged in one pressure adjustment passage 180 has been described, but it is obvious that a plurality of pressure adjustment passages 180 can be configured to be opened and closed by one elastic opening/closing portion 190.

For example, instead of the disk-shaped blocking member 191, a ring-shaped blocking member may be used. In this case, the concave portion 183 provided in the second body may be formed to have a circular shape so as to connect all the pressure adjustment passages 180, instead of a cylindrical shape corresponding to the respective pressure adjustment passages. The ring-shaped blocking member may be disposed to close all the pressure adjustment passages 180 circularly arranged in the second body. The elastic member that pressurizes the ring-shaped blocking member in a closing direction may be provided with a coil spring having a diameter corresponding to the ring-shaped blocking member.

According to the present invention, when assembling the damping force variable valve assembly, a stepped portion is formed on an outer peripheral surface of an end portion of the inlet port 145a of the spool guide 145. The low speed control valve 170 is fitted to come into contact with the stepped portion. Then, the first body 151, the second body 152, and the main valve 150 are fitted. In this manner, the damping force variable valve assembly may be formed.

Therefore, it is unnecessary to use a nut and it is possible to prevent a change in the damping force of the low speed valve according to a pressure caused by connection through the nut, as compared with a conventional assembling method by which the low speed control valve 170 is installed in the valve body (that is, the first body 151) and is tightened by a nut or the like.

The configuration in which the valve body is provided with two bodies (that is, the first body 151 and the second body 152) has been described above, but it is obvious that the valve body may be provided three or more bodies when necessary.

Hereinafter, the operation state of the damping force variable valve assembly in the soft mode according to the present invention will be described in detail with reference to FIG. 4.

As illustrated in FIG. 4, when the spool 144 is moved toward an opposite side of the inlet port 145a by the operation of the solenoid 141, the first passage 145c and the second passage 145d of the spool guide 145 communicate with each other, and the working fluid is not supplied toward the back pressure chamber 160. Therefore, the operation state becomes the soft mode state in which the damping force of the main valve is relatively reduced.

As indicated by a dashed line in FIG. 4, when the flow rate (that is, the flow velocity) of the working fluid in the soft mode is low, the working fluid passing through the main passage, that is, the inlet port 145a, the first inlet passage 145b, the second inlet passage 151a, and the third inlet passage 152a in sequence, flows toward the second passage 145d of the spool guide 145 through the slit formed on the inner periphery side of the disks included in the main valve 150.

Then, the working fluid passing through the second passage 145d flows toward the first passage 145c through the space between the spool guide 145 and the first small-diameter portion 144d of the spool, and the working fluid passing through the first passage 145c flows toward the low speed control valve 170 through the first low speed passage 152b and the second low speed passage 151b. A damping force in a low speed section is generated by the low speed control valve 170.

As such, since the damping force variable valve assembly can generate the damping force even in the low speed section, a small frequent vibration from a road surface can be effectively damped to improve ride comfort of a vehicle.

In addition, as illustrated in FIG. 4, when the flow rate (that is, flow velocity) of the working fluid in the soft mode is medium or high, the working fluid passing through the main passage, that is, the inlet port 145a, the first inlet passage 145b, the second inlet passage 151a, and the third inlet passage 152a in sequence, deforms and pushes the disks included in the main valve 150, passes through the opened main valve 150, and then flows toward the medium/high speed passage 152c. The working fluid flowing toward the medium/high speed passage 152c immediately flows into the reservoir chamber 30 (that is, the low pressure chamber PL) within the shock absorber.

In the configuration in which the low speed control valve is connected in series to the main valve so that the working fluid passes through the low speed control valve and is supplied to the main valve, it is possible to obtain the effect resulting from the low speed control valve, that is, the effect that improves the ride comfort during fine vibration due to the generation of the damping force even in a section in which the moving speed of the working fluid is low. However, the damping force characteristic of the main valve may be affected by the low speed control valve.

That is, since the working fluid has to pass through the low speed control valve 170 even in the medium/high speed section, the damping force characteristic of the main valve may be distorted.

However, in the configuration of the present invention in which the low speed control valve 170 is connected in parallel to the main valve 150, it is possible to obtain the effect resulting from the low speed control valve 170, that is, the effect that improves fine vibration performance and achieve a rounded ride comfort by ensuring the degree of freedom of tuning in the low speed section. In addition, since the damping force characteristic of the main valve 150 is not affected by the low speed control valve 170, it is possible to prevent the damping force characteristic of the main valve 150 from being distorted. Consequently, the damping force non-interlocking is possible in the low speed section and the medium/high speed section, and the valve performance can be improved by ensuring the degree of freedom of tuning in the medium/high speed section.

Therefore, according to the present invention, the damping force dispersion phenomenon can be improved because the passage of the working fluid flowing into the main valve 150, that is, the main passage, is separated from the passage of the working fluid flowing into the low speed control valve 170, that is, the low speed passage (first and second low speed passages 152b and 151b).

Hereinafter, the operation state of the damping force variable valve assembly in the hard mode according to the present invention will be described in detail with reference to FIG. 5.

As illustrated in FIG. 5, when the spool 144 is moved toward the inlet port 145a by the operation of the solenoid 141, the second passage 145d and the third passage 145e of the spool guide 145 communicate with each other, and the working fluid is not supplied toward the back pressure chamber 160. Therefore, the operation state becomes the hard mode state in which the damping force of the main valve is relatively increased.

As indicated by a solid state in FIG. 5, when the flow rate (that is, flow velocity) of the working fluid in the hard mode is low, the working fluid passing through the main passage, that is, the inlet port 145a, the first inlet passage 145b, the second inlet passage 151a, and the third inlet passage 152a in sequence, flows into the back pressure chamber 160 through the second passage 145d and the third passage 145e of the spool guide 145.

According to the present invention, the disk valve mounted on the valve body (that is, the second body 152) among the disk valves included in the main valve 150 has no slit, and the working fluid cannot flow through the main valve 150 until the disk valve is deformed and opened.

Therefore, as the working fluid is supplied to the back pressure chamber 160, the internal pressure of the back pressure chamber 160 is increased, and the blocking member 191 is opened when the internal pressure of the back pressure chamber 160 becomes higher than the applied pressure of the elastic member 192 included in the elastic opening/closing portion 190. Consequently, the flow of the working fluid through the pressure adjustment passage 180 is permitted. The working fluid passing through the pressure adjustment passage 180 is supplied to the low pressure chamber PL of the shock absorber.

In the hard mode, the applied pressure of the elastic member 192 may be set such that the elastic opening/closing portion 190 can be opened by a pressure lower than a pressure at which the main valve 150 is opened. In other words, as the flow rate (that is, flow velocity) of the working fluid is gradually increased in the hard mode, the internal pressure of the back pressure chamber 160 is increased. Then, when the internal pressure of the back pressure chamber 160 becomes higher than the applied pressure of the elastic member 192, the elastic opening/closing portion 190 is opened and the working fluid flows through the pressure adjustment passage 180. Finally, as described below, the main valve 150 is opened (which is indicated by a dashed line in FIG. 5).

According to the present invention, when the working fluid flows at a low speed in the hard mode, the damping force can be adjusted by the elastic opening/closing portion 190 having a constant preload (that is, the applied pressure of the elastic portion 192). Therefore, it is possible to prevent the working fluid from being discharged at the applied pressure or less of the elastic member 192. Hence, it is possible to ensure a relatively high and stable damping force even at a low speed section.

Due to the interaction between the spool and the spool guide, the flow of the working fluid toward the low speed control valve 170 does not occur in the hard mode even in the low speed flow of the working fluid.

In addition, as indicated by a dashed line in FIG. 5, when the flow rate (that is, flow velocity) of the working fluid in the hard mode is medium or high, the working fluid passing through the main passage, that is, the inlet port 145a, the first inlet passage 145b, the second inlet passage 151a, and the third inlet passage 152a in sequence, deforms and pushes the disks included in the main valve 150, passes through the opened main valve 150, and then flows toward the medium/high speed passage 152c. The working fluid flowing toward the medium/high speed passage 152c immediately flows into the reservoir chamber 30 (that is, the low pressure chamber PL) within the shock absorber.

As a result, according to the present invention, it is possible to improve the damping force characteristic in the hard mode in the low speed section (including the extremely low speed section), thereby stably generating a high damping force as compared with the conventional damping force variable valve assembly in which the slit is formed in the main valve.

That is, the discharge passage is not formed at the preset pressure or less by adjusting the pressure of the back pressure chamber 160 through the opening/closing operation of the elastic opening/closing portion 190. In this manner, it is possible to generate a high damping force in a low speed section, thereby controlling the behavior of the vehicle at an early stage.

The damping force variable valve assemblies according to specific embodiments of the present invention have been described, but it is obvious that various modifications can be made without departing from the scope of the present invention.

According to the present invention, there may be provided the damping force variable valve assembly in which when the damping force variable valve assembly operates in the hard mode, the stably high damping force is generated in the section where the flow rate of the working fluid is low or extremely low, thereby controlling the behavior of the vehicle at the early stage, and the degressive damping force characteristic is provided in the section where the flow rate of the working fluid is medium or high.

In addition, when the damping force variable valve assembly operates in the soft mode, the small frequent vibration from the road surface can be effectively reduced by enhancing the damping force characteristic in the low speed section (including the extremely low speed section), thereby improving ride comfort of the vehicle.

Furthermore, since the low speed control valve is installed not in series to the solenoid main valve but in parallel to the solenoid main valve, the damping force, which is obtained in the medium/high speed section by the solenoid main valve, is not adversely affected by the installation of the low speed control valve.

While the embodiments of the present invention have been described with reference to the specific embodiments, it will be apparent to those skilled in the art that various changes and modifications may be made without departing from the spirit and scope of the invention as defined in the following claims.

What is claimed is:

1. A damping force variable valve assembly, which is installed in a damping force variable shock absorber to adjust a damping force of the shock absorber, the damping force variable valve assembly comprising:
   a solenoid configured to generate a magnetic force when an electric current is applied thereto;
   a spool configured to be moved by the magnetic force of the solenoid;
   a spool guide configured to surround the spool so as to guide a movement of the spool;
   a valve body which is disposed around the spool guide;
   a main valve which is installed to cover a main passage formed in the valve body and generate a damping force;
   a back pressure chamber which is formed to have a back pressure pressurizing the main valve from the back of the main valve;
   a chamber forming body which is installed outside the valve body to form the back pressure chamber; and
   an elastic opening/closing portion which is installed in the valve body to open and close a pressure adjustment passage communicating the inside of the back pressure chamber with the outside of the back pressure chamber, wherein as a flow path within the damping force variable valve assembly is changed by interaction between the spool and the spool guide, the damping force of the shock absorber is variable between a hard mode in which the back pressure of the back pressure chamber is increased and a soft mode in which the back pressure of the back pressure chamber is decreased, wherein, in a case where a flow velocity of a working fluid is low in the hard mode, the elastic opening/closing portion opens the pressure adjustment passage when an internal pressure of the back pressure chamber exceeds a preset pressure, wherein the elastic opening/closing portion includes a blocking member configured to block the pressure adjustment passage, and an elastic member configured to elastically support the blocking member and to be deformed when the internal pressure of the back pressure chamber exceeds the preset pressure and open a flow passage by the blocking member and the elastic member, wherein the elastic opening/closing portion is disposed on an exit side of the pressure adjustment passage in the valve body, and a concave portion which is connected to the pressure adjustment passage is formed in the valve body such that the elastic opening/closing portion is disposed therein, wherein the blocking member has a ring shape, wherein the pressure adjustment passage is plurally provided and the plurality of pressure adjustment passages are circularly arranged in the valve body, wherein the concave portion is formed to have a circular shape to connect all the pressure adjustment passages, and wherein the blocking member having the ring shape is disposed to close all the pressure adjustment passages circularly arranged in the valve body.

2. The damping force variable valve assembly according to claim 1, wherein the concave portion includes a mounting portion which is formed in the pressure adjustment passage such that the blocking member is mounted thereon, and a locking portion which is formed on an exit side of the concave portion, and wherein one end of the elastic member is supported to the locking portion, and the other end of the elastic member is supported to the blocking member, such that the elastic member pressurizes the blocking member in a direction of closing the pressure adjustment passage.

3. The damping force variable valve assembly according to claim 1, wherein the blocking member is larger than the pressure adjustment passage and smaller than the concave portion.

4. The damping force variable valve assembly according to claim 1, wherein
the elastic member is a coil spring having a diameter corresponding to the blocking member having the ring shape.

5. The damping force variable valve assembly according to claim 1, further comprising a low speed control valve which is installed to cover a low speed passage formed in the valve body and generate a damping force,
wherein the low speed control valve generates the damping force when the flow velocity of the working fluid is low in the soft mode.

6. The damping force variable valve assembly according to claim 1, wherein the valve body is formed by sintering and the chamber forming body is formed by pressing.

7. The damping force variable valve assembly according to claim 1, wherein the spool is provided by alternately forming large-diameter portions and small-diameter portion, and the large-diameter portions are formed on both sides of the small-diameter portion, so that a pressure of the working fluid passing through the small-diameter portion is equally applied to the large-diameter portions formed on both sides of the small-diameter portion.

8. The damping force variable valve assembly according to claim 5, wherein a stepped portion coming into contact with the low speed control valve is formed on an outer peripheral surface of an inlet port of the spool guide, and the low speed control valve is disposed and assembled between the stepped portion and the valve body fitted into around the spool guide.

9. The damping force variable valve assembly according to claim 5, wherein the main valve and the low speed control valve are installed in parallel.

* * * * *